(12) United States Patent
DiPetrillo

(10) Patent No.: US 9,702,499 B1
(45) Date of Patent: Jul. 11, 2017

(54) THERMALLY PRE-INSULATED PIPE CLAMP

(71) Applicant: Craig J DiPetrillo, Chepachet, RI (US)

(72) Inventor: Craig J DiPetrillo, Chepachet, RI (US)

( * ) Notice: Subject to any disclaimer, the term of this patent is extended or adjusted under 35 U.S.C. 154(b) by 0 days.

(21) Appl. No.: 14/992,537

(22) Filed: Jan. 11, 2016

Related U.S. Application Data

(60) Provisional application No. 62/101,844, filed on Jan. 9, 2015.

(51) Int. Cl.
*F16L 3/12* (2006.01)
*F16L 59/13* (2006.01)
*F16L 59/135* (2006.01)

(52) U.S. Cl.
CPC ............. *F16L 59/13* (2013.01); *F16L 59/135* (2013.01)

(58) Field of Classification Search
CPC ........ H02G 3/32; F16L 3/1233; F16L 59/021; F16L 59/135; B64C 1/406
See application file for complete search history.

(56) References Cited

U.S. PATENT DOCUMENTS

| | | | | |
|---|---|---|---|---|
| 1,315,225 A * | 9/1919 | Hughes | ................. | F16L 3/2235 174/155 |
| 2,366,041 A * | 12/1944 | Morehouse | ........... | F16L 3/1233 24/564 |
| 2,372,683 A * | 4/1945 | Archibald | ............. | F16L 3/1233 24/339 |
| 2,373,833 A * | 4/1945 | Johnson | ................. | F16L 3/1233 248/74.3 |
| 2,399,899 A * | 5/1946 | Tinnerman | ................ | F16L 3/08 174/40 CC |
| 2,404,110 A * | 7/1946 | Trafton | ..................... | F16L 3/12 24/19 |
| 2,413,772 A * | 1/1947 | Morehouse | ........... | F16L 3/1233 24/336 |
| 2,423,222 A * | 7/1947 | Berry | .................... | F16L 3/1233 174/40 CC |
| 2,431,379 A * | 11/1947 | Ellinwood | ............ | F16L 3/1233 248/74.3 |
| 2,455,598 A * | 12/1948 | Michalenko | ............. | A47H 1/02 248/74.3 |
| 2,456,553 A * | 12/1948 | Churchill | .................. | F16L 3/24 248/229.16 |
| 2,475,172 A * | 7/1949 | Benedict | .................. | H02G 3/32 174/157 |

(Continued)

*Primary Examiner* — Bradley Duckworth
(74) *Attorney, Agent, or Firm* — Robert W. J. Usher

(57) ABSTRACT

A unitary, pre-insulated pipe clamp/hanger has a conventional C-channel section clamp/hanger-receiving body portion 1 with a pipe receiving mouth 2, a fastening nail receiving mounting portion 3 integrally formed along the exterior of one wall with the nail penetration direction extending in an opposite direction to a pipe insertion/receiving direction of the mouth, A lining strip of thermally insulating, closed cell, polyethylene foam 4 is adhered to line the entire interior of the channel with respective foam end portions 5,5' thereof protruding from the channel across the pipe-receiving mouth. One end portion 5' is longer than the other end portion 5, forming a mouth closing, flap. The resulting assembly has an R-value of at least 5. The adhesion can be by double-sided adhesive tape attached between the clamp channel portion and the foam. respectively.

12 Claims, 6 Drawing Sheets

(56) References Cited

U.S. PATENT DOCUMENTS

| | | | | |
|---|---|---|---|---|
| 2,692,746 A * | 10/1954 | Thomas | F16L 3/1233 | 248/74.3 |
| 2,922,733 A * | 1/1960 | Henning | F16L 3/1233 | 156/202 |
| 2,936,982 A * | 5/1960 | Cushenberry | F16L 3/1233 | 174/40 CC |
| 3,015,465 A * | 1/1962 | Schmitt | F16L 3/1233 | 248/73 |
| 3,084,892 A * | 4/1963 | Priestley | H02G 7/12 | 174/146 |
| 3,110,465 A * | 11/1963 | Sugarman | F16L 3/1233 | 248/74.3 |
| 3,196,535 A * | 7/1965 | Crawford, Jr. | F16L 3/1233 | 29/434 |
| 3,848,839 A * | 11/1974 | Tillman | F16L 3/04 | 248/62 |
| 4,338,707 A * | 7/1982 | Byerly | F16L 3/1008 | 24/20 LS |
| 5,220,710 A * | 6/1993 | Laudan | F16L 3/12 | 24/20 LS |
| 5,947,158 A * | 9/1999 | Gross | F16L 59/022 | 138/149 |
| 6,198,042 B1 * | 3/2001 | Huston | H02G 7/053 | 174/145 |
| 6,318,681 B1 * | 11/2001 | Vitoorapakorn | F16L 3/1233 | 138/149 |
| 6,641,906 B2 * | 11/2003 | Wittschen | B29C 47/0004 | 428/312.6 |
| 6,732,982 B1 * | 5/2004 | Messinger | F16L 3/1233 | 24/16 PB |
| 8,020,814 B2 * | 9/2011 | Geppert | F16L 3/12 | 248/74.1 |
| 8,038,104 B1 * | 10/2011 | Larkin | F16L 55/035 | 248/55 |
| 8,087,425 B2 * | 1/2012 | Railsback | F16L 3/1233 | 137/355.16 |
| 8,161,605 B2 * | 4/2012 | Reichel | F16L 3/123 | 24/20 R |
| 8,235,332 B2 * | 8/2012 | Cesarino | B60R 16/0215 | 248/65 |
| 8,714,496 B2 * | 5/2014 | Blanchard | F16L 3/123 | 248/62 |
| 9,255,521 B2 * | 2/2016 | Parry-Jones | F02C 7/00 | |
| 2007/0120022 A1 * | 5/2007 | Trotter | F16B 5/0685 | 248/49 |

* cited by examiner

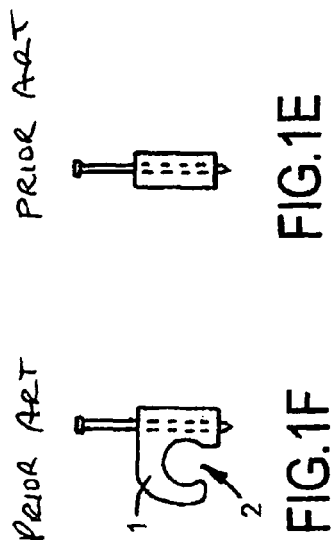

THERMALLY PRE-INSULATED PIPE CLAMP

RELATED APPLICATION

This application claims priority from my provisional application 62/101,844 filed Jan. 9, 2015, the disclosure of which is incorporated herein by reference.

FIELD OF THE INVENTION

The invention relates to pipe clamps/hangers for supporting coolant/refrigerant and heating fluid carrying pipes in thermally insulated condition.

BACKGROUND OF THE INVENTION

It is anticipated that energy codes for buildings will soon require more strict measures to prevent energy loss. Additionally, for increased structural reliability, closer spacing of pipe clamps/hangers will be required. Currently, although the pipes themselves are thermally insulated, generally with R5 rated plastic foam, pipe clamps/hangers usually remain uninsulated so that the increase in the number of uninsulated hangers in any pipe run will result in a proportionally significantly increased loss of cooling/heating efficiency, a commensurate increase in icing and deleterious condensation/dripping at hanger locations.

Effective hanger insulation would therefore be even more desirable but, at the same time, for economy in applied cost, the increased number of hangers required for any job would also require that any increase in handling/manipulation time to insulate the pipe hanger/clamp be minimized or obviated.

SUMMARY OF THE INVENTION

According to one aspect, the invention provides a unitary, thermally pre-insulated pipe clamp/hanger assembly comprising: a supporting body having a mounting portion for attachment to a support and a C-section, channel portion for receiving a pipe therein; and, a lining strip of resiliently compressible, thermally insulating foam adhered in covering relation to an inner surface of the channel, the foam strip having opposite end portions with at least one end portion being free and protruding across a pipe-receiving mouth of the channel towards the opposite end portion of the foam, on an opposite side of the mouth, thereby at least partly restricting the mouth.

Pr-adhering the foam directly to the inner surface of the clamp body using a factory applied adhesive or bonding agent obviates need for any additional component possibly requiring additional storage and additional foam assembly (eg clamp wrapping) that would require substantial additional, time consuming manipulation by a user in the field.

The clamp assembly can contain a coolant/heating fluid pipe stuffed into the channel through the mouth essentially by manual pressure with only minor compression of the foam lining.

In some embodiments, pipe insertion brings the end portions of the insulating foam together in thermally insulating engagement to complete foam encirclement of the pipe.

In one embodiment of the invention, one channel wall, with which the mounting portion is integral, is longer (of greater height) than the other channel wall and, the one free end portion of foam extends from an upper free end of the other wall and is longer than the opposite end portion of foam which is located on an upper free end of the one channel wall, such that the free end portion of foam protrudes beyond the shorter wall and across at least a majority of the width of the channel mouth in strap-like fashion forming a hook-shape, resilient flap which overlaps the other end portion of insulating foam. The foam flap may be raised away from the mouth by engagement with a transversely extending pipe during initial insertion into the clamp, aided if needed, by a user's finger.

In constructing one version of the clamp assembly, a tube of thermally insulating foam is slit longitudinally and stuffed, with radial compression through the mouth into the channel and adhered thereto (by manufacturer's glue, pre-applied to either or both components) in axially extending covering relation to an interior surface thereof such that opposite slit edge portions of the insulating tube adhere to the opposite lips of the mouth adjacent each other.

In another embodiment, the foam insulation is formed as a continuous extrusion, (subsequently cut to suitable lengths), in which the free end portions progressively increase in thickness towards their tips and have end portions of complementary profile such that the free end tip of the shorter end portion fits against the overlapping inside surface of the flap-form end portion.

As the insulated clamp of the invention is provided as a unitary assembly, time consuming manipulation in the field of separate insulation and clamp body are avoided. Additionally, the receipt of the coolant/heat conveying pipe into the hanger with a clipping action, simply by application of transverse finger pressure, facilitate attachment of the hanger at any selected point along the pipe, (possibly between pre-insulated sections), as judged necessary or convenient in a particular application in the field.

BRIEF DESCRIPTION OF THE DRAWINGS

Embodiments of the invention will now be described with reference to the accompanying drawings in which:

FIGS. 1A, 1B; 1C, 1D; 1E and 1F are diagrammatic end and side views respectively, of a typical polyethylene pipe/tubing (PEX); foam insulation; and a conventional pipe hanger/clamp body;

FIGS. 2A and 2B are diagrammatic side views of a pre-insulated unitary pipe hanger/clamp of the invention before and after insertion of the pipe therein;

PARTICULAR DESCRIPTION

Figure 4:
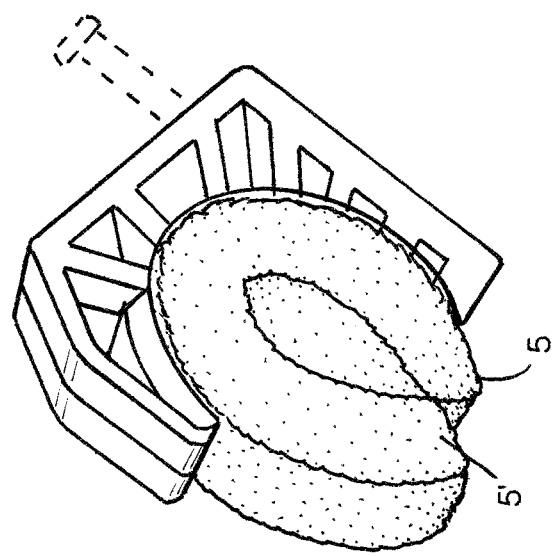
FIG. 4 is a schematic perspective view of the pre-insulated pipe clamp/hanger prior to receipt of the pipe and illustrating the relative dispositions of the end portions of the foam insulation lining.
Figure 3:
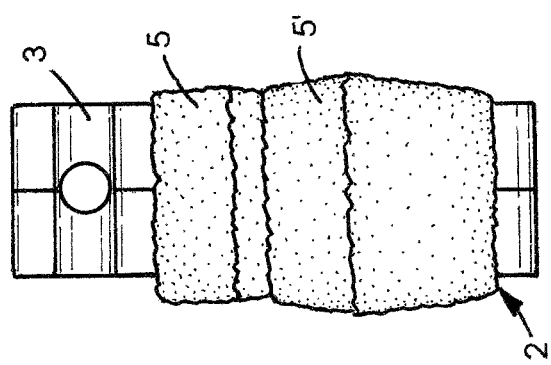
FIG. 3 is a perspective view of a foam covered mouth of the pre-insulated pipe clamp/hanger.

As shown particularly in FIGS. 2A-2B, and 3-7, a unitary, pre-insulated pipe clamp/hanger according to a first embodiment of the invention comprises a conventional C-channel section ¾" PEX clamp/hanger body portion 1 with a pipe receiving mouth 2, a fastening nail receiving mounting portion 3 integrally formed along the exterior of one (longer) wall/arm of the channel section with the nail penetration direction extending in an opposite direction to a pipe insertion/receiving direction of the mouth, A lining strip of thermally insulating, closed cell, polyethylene foam 4 is secured by adhesive (not shown) to directly line the entire interior of the channel with respective foam end portions 5,5' thereof protruding from the channel part way towards each other across the pipe-receiving mouth. One of the end portions 5' is much longer than the other end portion 5, forming a resilient, mouth closing, flap. The resulting assembly has an R-value of at least 5.

The insulating foam 4 is installed in the body by an uncompressed method which will then will permit a ½" PEX tubing 6 to be inserted/received manually.

Figure 11C:
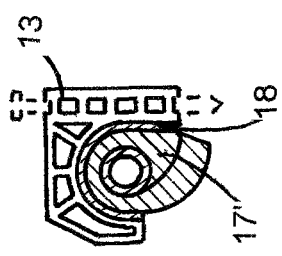
Figure 11A:
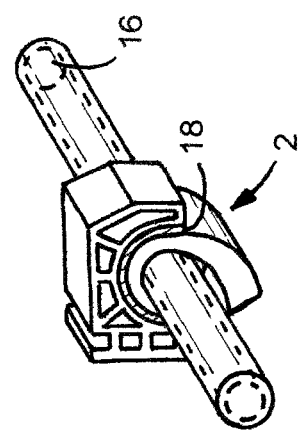
Figure 11B:
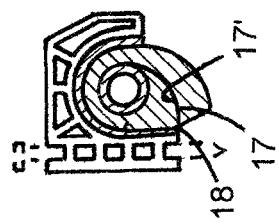

In the embodiment of FIGS. 10 and 11, the clip body 11 is cavitied for maximum strength with minimum material. A lining strip 18 of double-sided adhesive tape adheres to the interior surface of the channel, covering it completely. The foam insulation protrudes a short distance from each side as shown at 4' in FIG. 10E to completely fill the gap in the pipe insulation where the clamp is secured to ensure continuous insulation.

The foam is formed as an extrusion in which the free end portions 15,15' progressively increase in thickness towards their tips and have complementary curved profiled surface portions 17,17', such that the free end of the shorter end portion fits against the overlapping inside surface of the flap-form end portion of the foam lining, with the curved profiles of the free ends increasing the area of contact and therefore the thermal sealing, The end portions are closed together in abutment both before and after pipe insertion.

Figure 6:
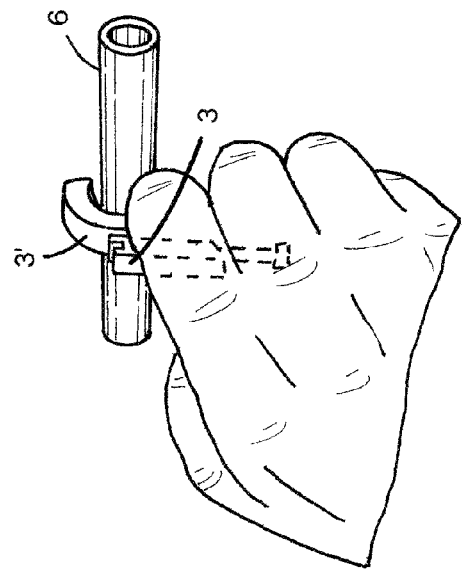
FIG. 6 is a perspective view showing a subsequent stage in which the foam flap is hooked over the pipe, aiding alignment of the pipe for complete insertion through the mouth and into the pre-insulated body by relative vertical movement of the pipe and clamp.
Figure 5:
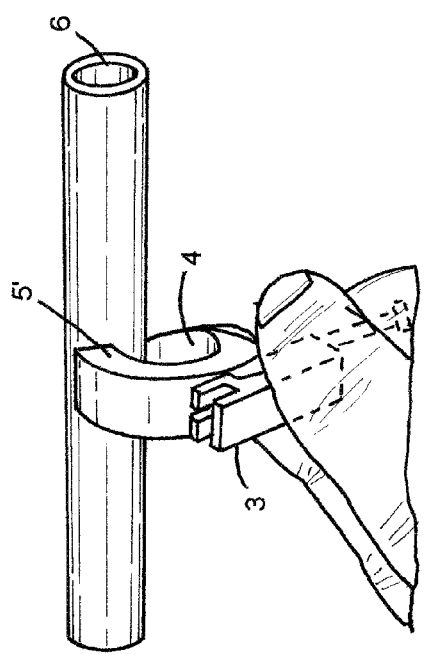
FIG. 5 is a perspective view showing an initial stage in the insertion assembly of a pipe into the pre-insulated pipe clamp/hanger in which the end of the foam flap has been pushed/raised away from the mouth by the pipe registration.
Figure 7:
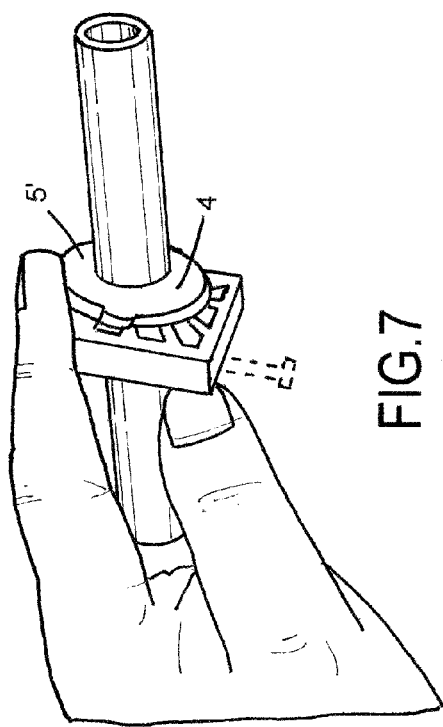
FIG. 7 is a perspective view showing the pipe fully inserted and the upper, longer foam end portion being retained in firm engagement around the upper side of the pipe by an installer's finger prior to permanent firm retention by engagement with the underside of a floor joist by hammering the nail into the joist.
Figure 8:
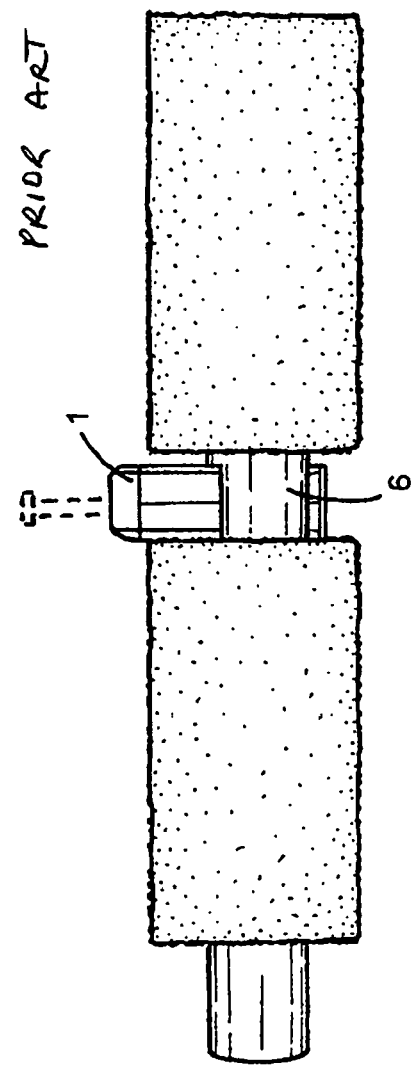
FIG. 8 is a perspective view of a PEX pipe with foam insulation on respective end portions and a pre-insulated pipe clamp/hanger of the invention clamped to a central, otherwise uninsulated, portion of the pipe, located snugly between the pipe insulation.
Figure 9:
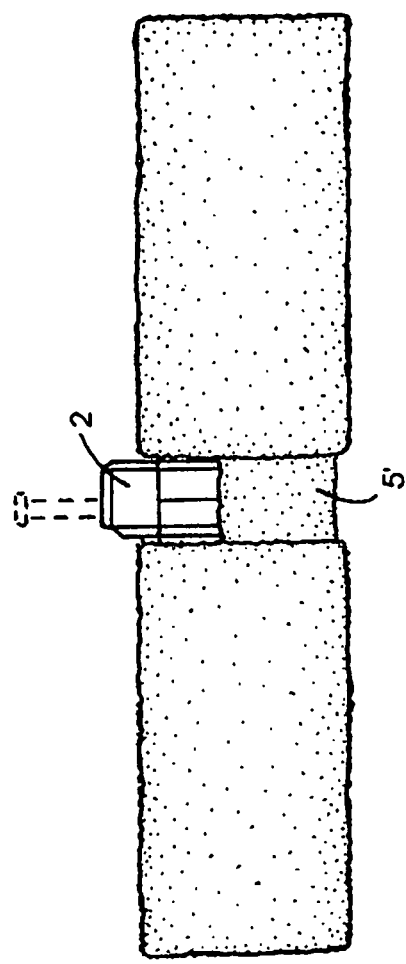
FIG. 9 is a perspective view showing an uninsulated, conventional hanger/clamp body clamped to a central uninsulated portion of otherwise foam insulated PEX revealing the uninsulated region subject to unwanted heat transfer; and, FIGS. 10A-10E and 11A-11C, respectively, are various views of components of another embodiment before and after pipe insertion.
Figure 10B:
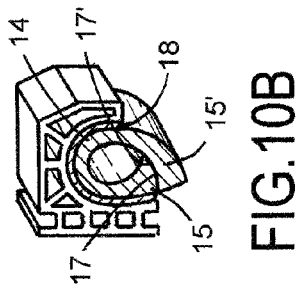
Figure 10A:
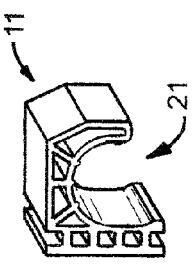
Figure 10D:
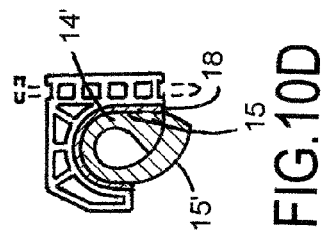
Figure 10C:
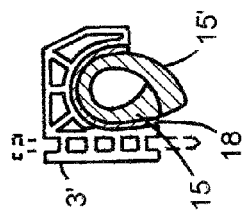
Figure 10E:
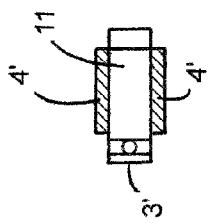

Insertion of the pipe into the clamp occurs in two steps; the longer foam end portion, and the pipe are aligned as shown in FIG. 5 and then moved laterally (horizontally), so that the pipe pushes up the foam end portion, (also lifted, if needed, by the installer's finger), and passes through the gap between the two foam end portions into engagement with the longer end portion, which provides a hooking and guiding action aiding alignment of the pipe vertically above the mouth with the tip of the end portion extending over the pipe, as shown in FIG. 6. The pipe is then received fully into the clamp/clip channel through the mouth by relative (vertical) movement of the clamp and pipe together. As shown in FIG. 6, the installer uses his finger to press and retain the upper, longer, end portion of foam in firm engagement around the upper surface of the pipe, strap fashion until the assembly is raised into engagement with the underside of a floor joist support which engages the foam end portion keeping it in place and the nail is driven into the joist to complete the insulating encirclement of the pipe by the foam.

The clamps can be manufactured in many sizes to accommodate the construction industry and the color, curves and edges on clamp will be designed to be to be unique.

The foam insulation does not compact with age, but expands and contracts with changes in ambient temperature, maintaining the pipes completely covered, avoiding dripping from condensation on coolant carrying pipes.

In the region where the foam surrounds the pipe at the mouth, the foam self-seals thermally because the ends of the foam, corresponding to the edges of a slit foam tube, are subsequently shaped/angled to provide flat abutting surfaces, when the pipe is fully inserted.

The invention claimed is:

1. A unitary, thermally pre-insulated pipe clamp/hanger assembly for a pipe carrying heating or cooling fluid in a building comprising:
   a supporting body having a mounting portion for attachment to the building and a C-section channel portion for receiving a pipe portion therein through a mouth thereof and,
   an elongate lining strip of resiliently compressible, thermally insulating foam adhered in covering relation to an inner surface of the channel portion, the foam strip having opposite longitudinal end portions adjacent respective opposite sides of the mouth of the channel portion with at least one end portion protruding across the mouth of the channel towards an opposite end portion, thereby forming a foam flap movable between positions opening the mouth to permit receipt of the pipe portion in the channel portion and closing the mouth with the pipe portion received in the channel portion and the foam strip being for completely encircling the pipe portion in thermally insulating contact with an entire surface thereof.

2. An assembly according to claim 1 wherein the foam flap is movable away from the mouth of the channel portion by engagement with the pipe portion.

3. An assembly according to claim 2 wherein the channel portion comprises a first wall and a second wall, upstanding in spaced apart relation on opposite sides of a base of the channel portion, respectively, the first wall adjoins the mounting portion and is higher than the second wall and, said foam flap extends from an upper free end of the second wall and is longer than the opposite end portion of the foam strip which is located on an upper free end of the first channel wall, such that the foam flap protrudes beyond the shorter wall and across at least a majority of the width of the channel mouth forming a hook-shape, which overlaps the opposite end portion of the foam strip.

4. An assembly according to claim 1 wherein the end portions of the foam strip progressively increase in thickness toward towards their respective tips, which tips have complementary profiles such that the tip of the shorter end portion fits against the overlapping inside surface of the tip of the foam flap.

5. An assembly according to claim 1 wherein the thermally insulating foam is adhered to the inner surface of the channel portion by a double sided adhesive tape having respective opposite sides adhering to the inside of the inner surface of the supporting body and the foam lining, respectively.

6. An assembly according to claim 4 having an R value of at least 5.

7. A thermally pre-insulated pipe clamp/hanger assembly for a pipe carrying heating or cooling fluid in a building comprising:
- a supporting body having a mounting portion for attachment to a building and a receptacle portion with a mouth for admitting a portion of a pipe carrying heating or cooling fluid into the receptacle portion, and
- an elongate lining strip of resiliently compressible, thermally insulating foam adhered in covering relation to an inner surface of the receptacle portion and having a longitudinal end portion forming a foam flap covering the mouth so that, when the pipe portion is in the receptacle portion, the foam strip can completely encircle the pipe portion in thermally insulating contact with an entire surface thereof.

8. An assembly according to claim 7 having an R value of at least 5.

9. An assembly according to claim 7 wherein the thermally insulating foam is adhered to the inner surface of the receptacle portion by double sided adhesive tape having respective opposite sides adhering to the inner surface of the receptacle and to the foam lining strip, respectively.

10. An assembly according to claim 8 wherein the thermally insulating foam is adhered to the inner surface of the receptacle portion by double sided adhesive tape having respective opposite sides adhering to the inner surface of the receptacle portion and to the foam lining strip, respectively.

11. An assembly according to claim 7 wherein the longitudinal end portion of the foam strip progressively increases in thickness towards a tip, increasing the thermal insulation by the foam strip over the mouth.

12. An assembly of a thermally pre-insulated pipe clamp/hanger and a pipe carrying heating or cooling fluid in a building, the pipe clamp/hanger comprising:
- a supporting body having a mounting portion of attachment to the building and a receptacle portion with a mouth for admitting a portion of the pipe carrying heating or cooling fluid into the receptacle portion,
- an elongate lining strip of resiliently compressible, thermally insulating foam adhered in covering relation to an inner surface of the receptacle portion and having a longitudinal end portion forming a foam flap covering the mouth; and,
- a portion of the pipe admitted into the receptacle portion with the foam strip completely encircling the pipe portion in thermally insulating contact with an entire surface thereof.

* * * * *